United States Patent
Deng et al.

(10) Patent No.: US 11,071,150 B2
(45) Date of Patent: Jul. 20, 2021

(54) TRUE WIRELESS SOLUTION FOR BT STEREO AUDIO PLAYBACK

(71) Applicant: Google LLC, Mountain View, CA (US)

(72) Inventors: Hongyang Deng, San Jose, CA (US); Shijing Xian, Sunnyvale, CA (US); Guang Xie, San Jose, CA (US); Chi Kin Benjamin Leung, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/400,701

(22) Filed: May 1, 2019

(65) Prior Publication Data
US 2019/0342926 A1  Nov. 7, 2019

Related U.S. Application Data

(60) Provisional application No. 62/665,750, filed on May 2, 2018.

(51) Int. Cl.
*H04W 76/10* (2018.01)
*H04L 1/18* (2006.01)
*H04R 3/12* (2006.01)

(52) U.S. Cl.
CPC ............. *H04W 76/10* (2018.02); *H04L 1/18* (2013.01); *H04R 3/12* (2013.01); *H04R 2420/07* (2013.01)

(58) Field of Classification Search
CPC ..... H04W 76/10; H04W 84/20; H04W 76/14; H04W 84/18; H04L 1/18; H04R 3/12; H04R 2420/07; H04R 5/033
See application file for complete search history.

(56) References Cited

U.S. PATENT DOCUMENTS

| 10,200,791 B1* | 2/2019 | Liu .................... H04R 5/033 |
| 2012/0058727 A1* | 3/2012 | Cook .................... H04R 3/00 455/41.3 |

(Continued)

FOREIGN PATENT DOCUMENTS

| CN | 102065378 A | 5/2011 |
| CN | 102622949 A | 8/2012 |

(Continued)

OTHER PUBLICATIONS

International Search Report and Written Opinion for International Application No. PCT/US2019/030190 dated Jul. 11, 2019. 15 pages.

(Continued)

*Primary Examiner* — Dady Chery
(74) *Attorney, Agent, or Firm* — Lerner, David, Littenberg, Krumholz & Mentlik, LLP

(57) ABSTRACT

The technology relates to establishing wireless communication links, or connections, between a first audio accessory device, a second audio accessory device, and a client computing device. After receiving signals from the client computing device to initiate audio output, the first audio accessory device and the second audio accessory device may both perform a series of steps in parallel to establish connections with the client computing device and with each other. The series of steps may include relaying one or more acknowledgement (ACK) signals between the audio accessory devices in order to confirm proper receipt of the signals from the client computing device at both audio accessory devices. Alternatively, the series of steps may include transmitting a jamming signal from one of the audio accessory devices in order to prevent an ACK signal from the other audio accessory device from reaching the client computing device and initiating audio output.

17 Claims, 6 Drawing Sheets

(56) References Cited

U.S. PATENT DOCUMENTS

| | | |
|---|---|---|
| 2016/0316051 A1 | 10/2016 | Hsieh |
| 2016/0360018 A1 | 12/2016 | Watson et al. |
| 2016/0360350 A1 | 12/2016 | Watson et al. |
| 2017/0019398 A1 | 1/2017 | Blewett et al. |
| 2019/0174232 A1 | 6/2019 | Tong et al. |

FOREIGN PATENT DOCUMENTS

| | | |
|---|---|---|
| CN | 103139529 A | 6/2013 |
| CN | 105208514 A | 12/2015 |
| CN | 105451300 A | 3/2016 |
| CN | 105847096 A | 8/2016 |
| CN | 106412326 A | 2/2017 |
| CN | 106507278 A | 3/2017 |
| CN | 107894881 A | 4/2018 |
| EP | 2852201 A1 | 3/2015 |
| EP | 2926574 A1 | 10/2015 |
| JP | 2016174375 A | 9/2016 |

OTHER PUBLICATIONS

International Preliminary Report on Patentability for International Application No. PCT/US2019/030190 dated Nov. 12, 2020. 10 pages.

Cao. Research on Relaying Protocols and Relay Selection Scheme in Wireless Cooperation Communication. Apr. 2014. China Electronic Journal of Master Dissertation, 78 pages. English translation of abstract only.

Notification of the First Office Action for Chinese Patent Application No. 201980024308.0 dated Apr. 27, 2021. 8 pages.

Takyu et al. Fundamental Study on Adaptive ACK Link Control for Downloading based on TCP Connection in Mobile Wireless Communication. Jan. 26, 2012. 2011 IEEE 22nd International Symposium on Personal, Indoor and Mobile Radio Communications, pp. 2364-2368.

* cited by examiner

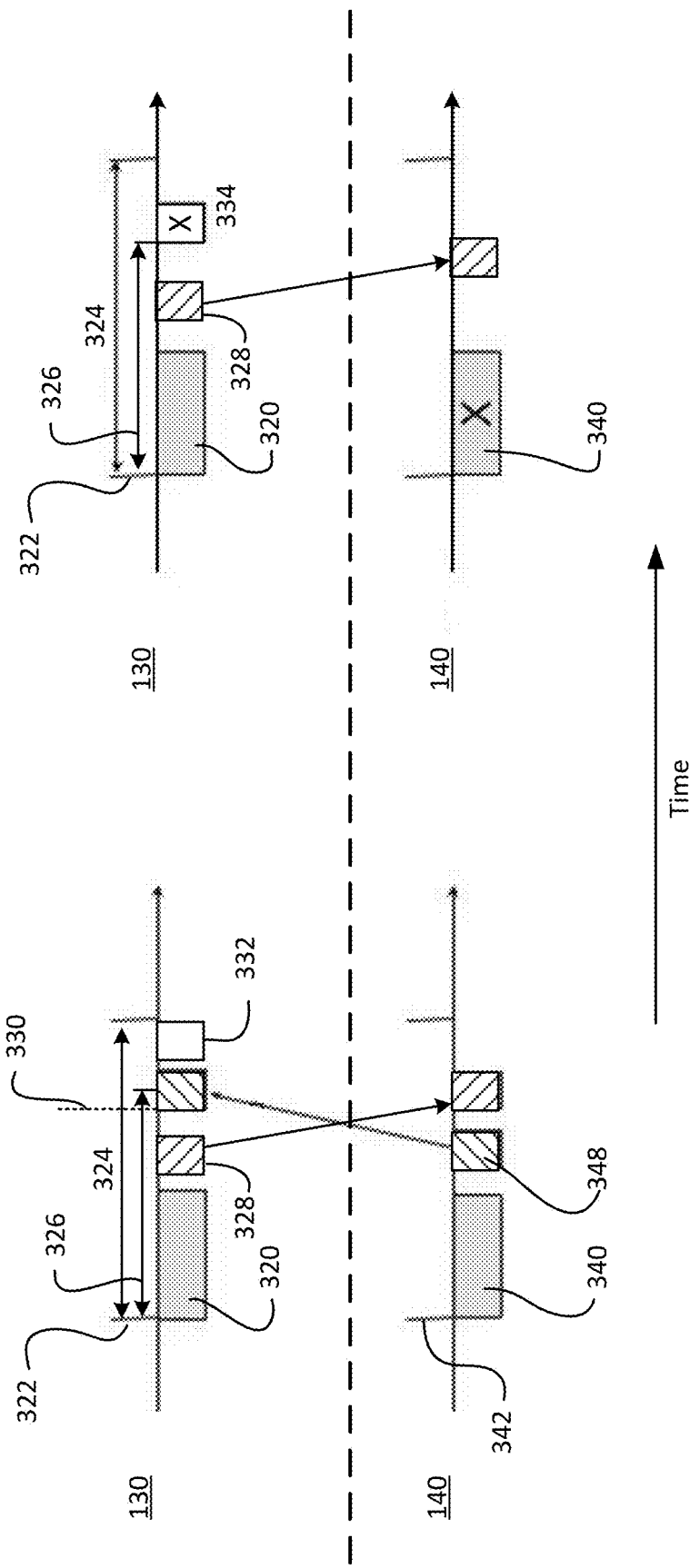

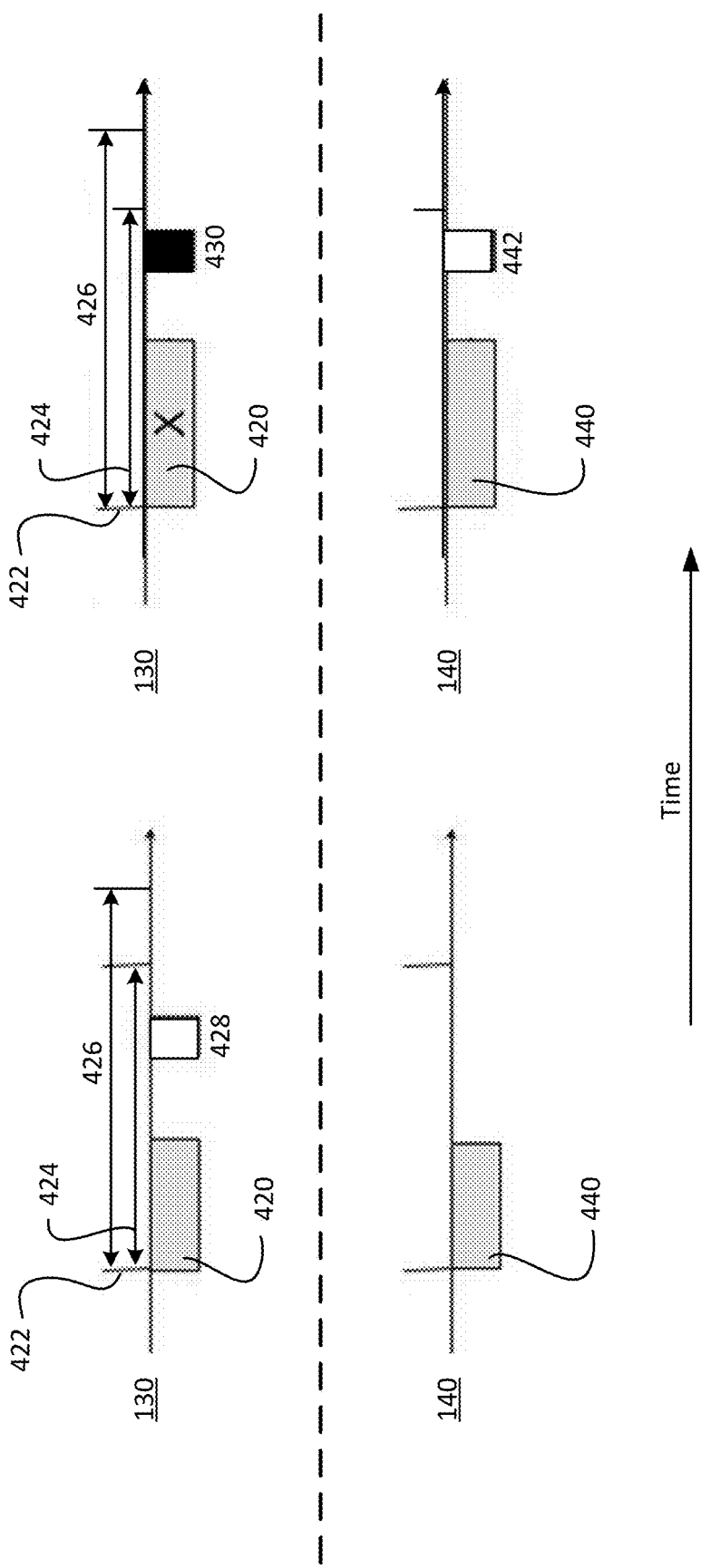

TRUE WIRELESS SOLUTION FOR BT STEREO AUDIO PLAYBACK

CROSS-REFERENCE TO RELATED APPLICATIONS

The present application claims the benefit of the filing date of U.S. Provisional Patent Application No. 62/665,750 filed May 2, 2018, the disclosure of which is hereby incorporated herein by reference.

BACKGROUND

Earbuds typically include pair of speakers that can be worn at least partially in a user's ear. Some earbuds may be considered "true wireless" that is there is no wire connection between either earbud and a client device that provides signals included encoded packets of data to the earbuds in order to generate sounds for the users. For true wireless earbuds, one way to save power is to have both earbuds of the pair of earbuds listen to the same channel with the client device and decode received packets separately in order to produce audio output. In these and many other implementations, only one earbud of a pair of earbuds can send acknowledgement packets, or signals, to the client device in response to receiving a packet from the client device. Glitches, for instance in the generated sounds, may occur when the other of the pair of earbuds loses the packet for one reason or another.

BRIEF SUMMARY

Aspects of the disclosure provide for a method. The method includes establishing, by one or more processors at a first audio accessory device, a first wireless connection with a second audio accessory device and a second wireless connection with a client computing device; receiving, by the one or more processors, a first signal from the client computing device at a first point in time via the second wireless connection; determining, by the one or more processors, whether the first signal is acceptable; when the first signal is acceptable, transmitting, by the one or more processors, a first acknowledgement (ACK) signal to the second audio accessory device via the first wireless connection; determining, by the one or more processors, whether a second ACK signal from the second audio accessory device is received by the one or more processors within an amount of time, the second ACK signal including a timestamp for a second point in time when a second signal from the client computing device is received at the second audio accessory device; when the second ACK signal is received within the amount of time, determining, by the one or more processors, an status identification the first audio accessory device, the status identification including a primary device or secondary device; and operating, by the one or more processors, the first audio accessory device based on the determined status identification.

Other aspects of the disclosure provide for another method. The method includes establishing, by one or more processors at a first audio accessory device, a first wireless connection with a second audio accessory device and a second wireless connection with a client computing device; receiving, by the one or more processors, a first signal from the client computing device at a first point in time via the second wireless connection; determining, by the one or more processors, whether the first signal is acceptable; when the first signal is not acceptable, determining, by the one or more processors, whether the first audio accessory device is a secondary device in relation to the second audio accessory device; and when the first audio accessory device is the secondary device, transmitting, by the one or more processors, a jamming signal configured to prevent the client computing device from receiving an acknowledgement (ACK) signal from the second audio accessory device.

BRIEF DESCRIPTION OF THE DRAWINGS

FIGS. 3B and 3C are signal timing diagrams illustrating the example method of FIG. 3A.

FIGS. 4B and 4C are signal timing diagrams illustrating the example method of FIG. 4A.

DETAILED DESCRIPTION

Overview

The technology relates to establishing wireless communication links, or connections, between a first audio accessory device, a second audio accessory device, and a client computing device. The first audio accessory device and second audio accessory device may be a pair of earbuds configured to provide audio playback, or audio output, to a user as a single unit. After receiving signals from the client computing device to initiate audio output, the first audio accessory device and the second audio accessory device may each perform a series of steps in parallel to establish connections with the client computing device and optionally with each other. The series of steps may be configured so that audio output is initiated only when both audio accessory devices have properly received the signals from the client computing device.

The series of steps may include relaying one or more acknowledgement (ACK) signals between the audio accessory devices in order to confirm proper receipt of the signals from the client computing device at both audio accessory devices. Alternatively, the series of steps may include transmitting a jamming signal from one of the audio accessory devices in order to prevent an ACK signal from the other audio accessory device from reaching the client computing device and initiating audio output.

The features described herein may allow wireless audio accessory devices to more reliably connect with client devices. Not only may all audio accessory devices be in communication with a client device, but also audio output may only be initiated when all the audio accessory devices are properly prepared to do so. In addition, power consumption at the audio accessory devices may be reduced when both audio accessory devices are receiving signals directly from the client device in comparison to when one of the audio accessory devices is more frequently communicating between the client computing device and the other audio accessory device.

Example Systems

Figure 1:
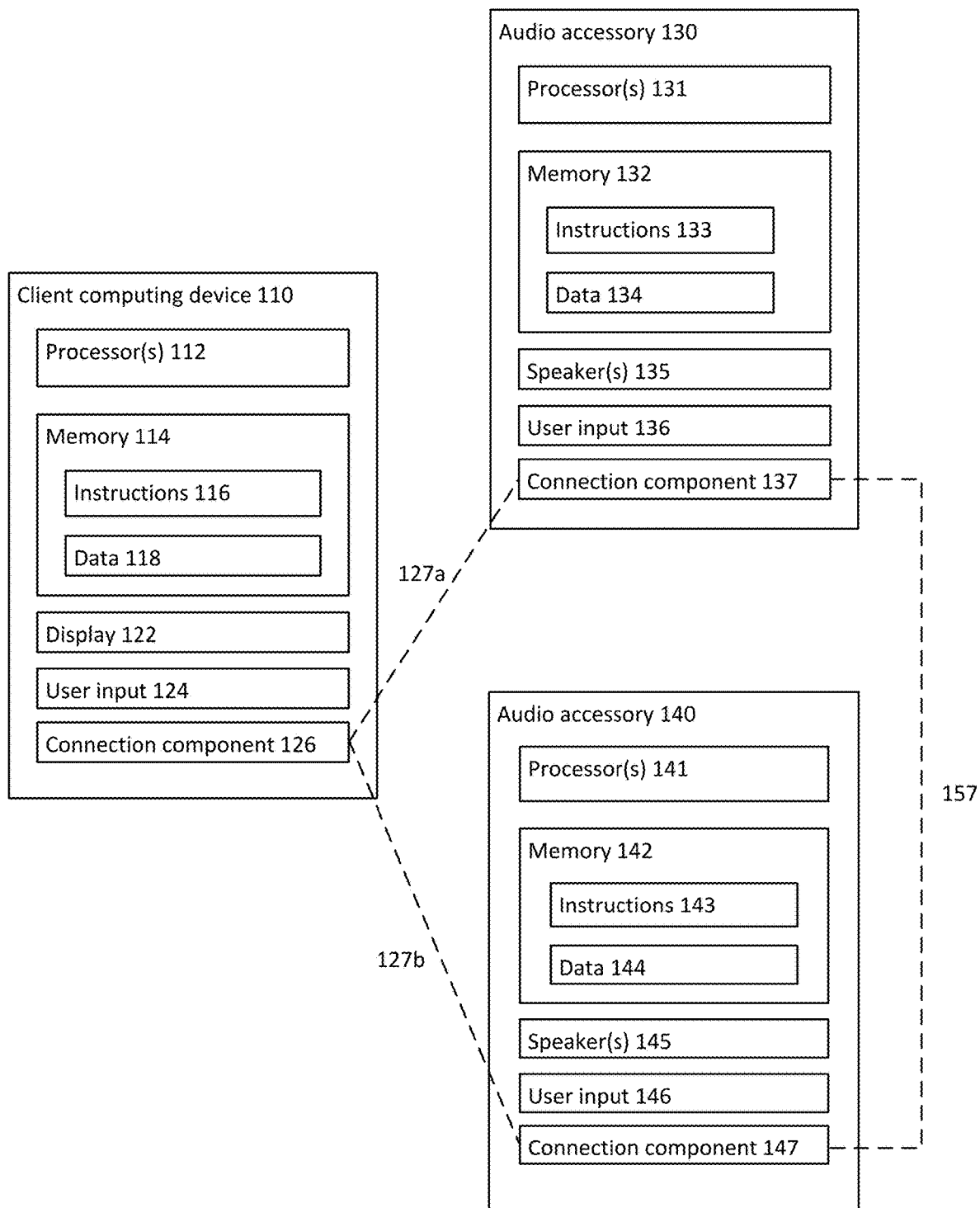
FIG. 1 is a functional diagram of an example system 100 in accordance with aspects of the disclosure.
Figure 2:
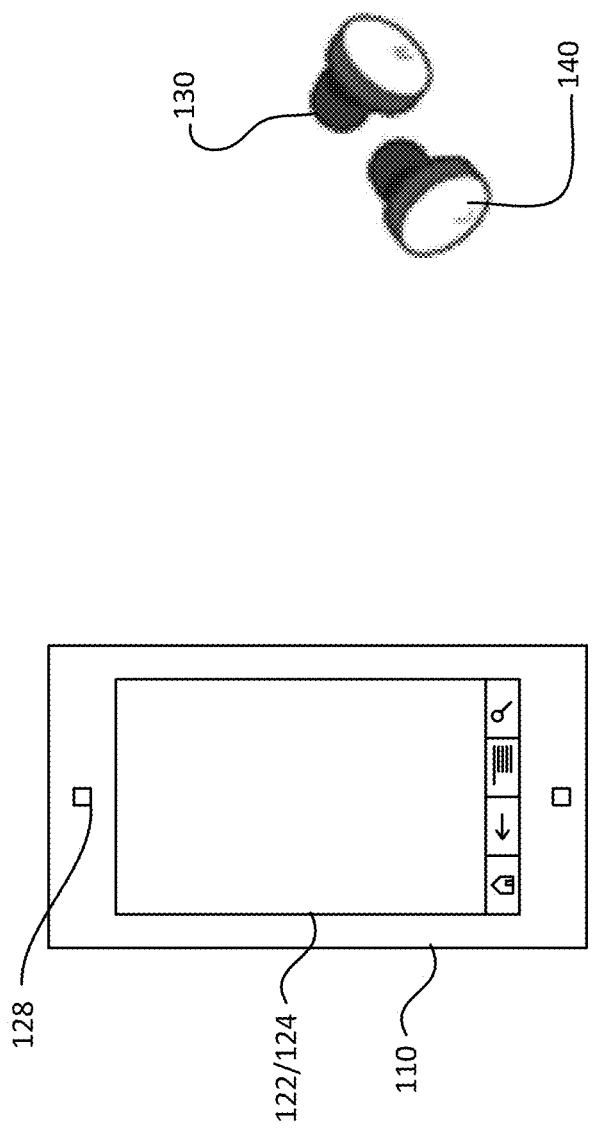
FIG. 2 is a pictorial diagram of the example system 100 in accordance with aspects of the disclosure.

FIGS. 1 and 2 depict example system 100 in which the features described herein may be implemented. It should not be considered as limiting the scope of the disclosure or usefulness of the features described herein. In this example, system 100 can include computing devices 110, 130, and 140.

Computing device 110 can contain one or more processors 112 and memory 114 as well as various other components as discussed below. Memory 114 of the computing device 110 can store information accessible by the one or more processors 112, including instructions 116 that can be executed by the one or more processors 112. Memory can also include data 118 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 116 can be any set of instructions to be executed directly, such as machine code, or indirectly, such as scripts, by the one or more processors. In that regard, the terms "instructions," "application," "steps" and "programs" can be used interchangeably herein. The instructions can be stored in object code format for direct processing by a processor, or in any other computing device language including scripts or collections of independent source code modules that are interpreted on demand or compiled in advance. Functions, methods and routines of the instructions are explained in more detail below.

Data 118 can be retrieved, stored or modified by the one or more processors 112 in accordance with the instructions 116. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can be any conventional processors, such as a commercially available CPU. Alternatively, the processors can be dedicated components such as an application specific integrated circuit ("ASIC") or other hardware-based processor. Although not necessary, one or more of computing devices 110 may include specialized hardware components to perform specific computing processes, such as decoding video, matching video frames with images, distorting videos, encoding distorted videos, etc. faster or more efficiently.

Although FIG. 1 functionally illustrates the processor, memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in housings different from that of the computing device 110. Accordingly, references to a processor, computer, computing device, or memory will be understood to include references to a collection of processors, computers, computing devices, or memories that may or may not operate in parallel.

The computing devices 130 and 140 may include one or more processors 131, 141 and memories 132, 142 that have same or similar features to the one or more processors 112 and the memory 114 of computing device 110. As shown in FIG. 1, the memories of the computing device 130 and 140 may also store information, such as instructions 133, 143 and data 134, 144, in a same or similar manner as described above with respect to memory 114, instructions 116, and data 118.

Each computing device 110, 130, 140 may be capable of wirelessly exchanging data with one another using one or more signals. For instance, computing device 110 may be a device such as a mobile phone, wireless-enabled PDA, a tablet PC, a netbook, a full-sized personal computing device, or any other type of client computing device. The client computing device 110 may have all of the components normally used in connection with a personal computing device such as processors and memory discussed above as well as a display such as display 122 (e.g., a touch-screen, a projector, a television, a monitor having a screen, or other device that is operable to display information), and user input device 124 (e.g., a mouse, keyboard, touch-screen, touch sensor, one or more buttons, or microphone). The client computing device 110 may also include connection component 126 (shown only in FIG. 1) that can be used to facilitate wireless connections 127a or 127b, such as via WiFi or Bluetooth protocols, with audio accessories 130, 140. For example, the connection component 126 may be a wireless transmitter and receiver.

Computing devices 130 and 140 may each be an audio accessory device configured to communicate via wireless connection 127a, 127b with the client computing device 110 and via wireless connection 157 with one another. For instance, the audio accessory device 130 may include one or more speakers 135 for generating sound, a user input device 136 to allow a user to input instructions, and a connection component 137, such as a wireless transmitter and receiver configured to facilitate wireless connections with a client computing device or another audio accessory device, such as wireless connections 127a and 157. Similarly, the audio accessory device 140 may include one or more speakers 145 for generating sound, a user input device 146 to allow a user to input instructions, and a connection component 147, such as a wireless transmitter and receiver configured to establish wireless connections with a client computing device or another audio accessory device, such as wireless connections 127b and 157. In some examples, only one of the audio accessory devices 130, 140 has a user input device.

As shown in FIG. 2, audio accessory devices 130 and 140 may be a set of wireless ear buds. For the purposes of clarity, audio accessory device 130 may be considered a first wireless earbud in the set, corresponding to speaker 135, and audio accessory device 140 may be considered a second wireless earbud in the set, corresponding to speaker 145. The audio accessory devices 130 and 140 may be configured to be worn in or at least partially in a user's ear and to provide audio output to the user based on instructions from the client computing device 110 received via the wireless connections 127a and 127b. The set of wireless earbuds shown in FIG. 2 are wireless in that that is there is no wire connection between any audio accessory device 130 or 140 and the client computing device 110. Although the examples herein relate to wireless earbuds, the features described herein may also be applied to other wireless audio accessory devices such as wireless headphones, a pair of wireless "stand-alone" speakers, etc.

Example Methods

Figure 3A:
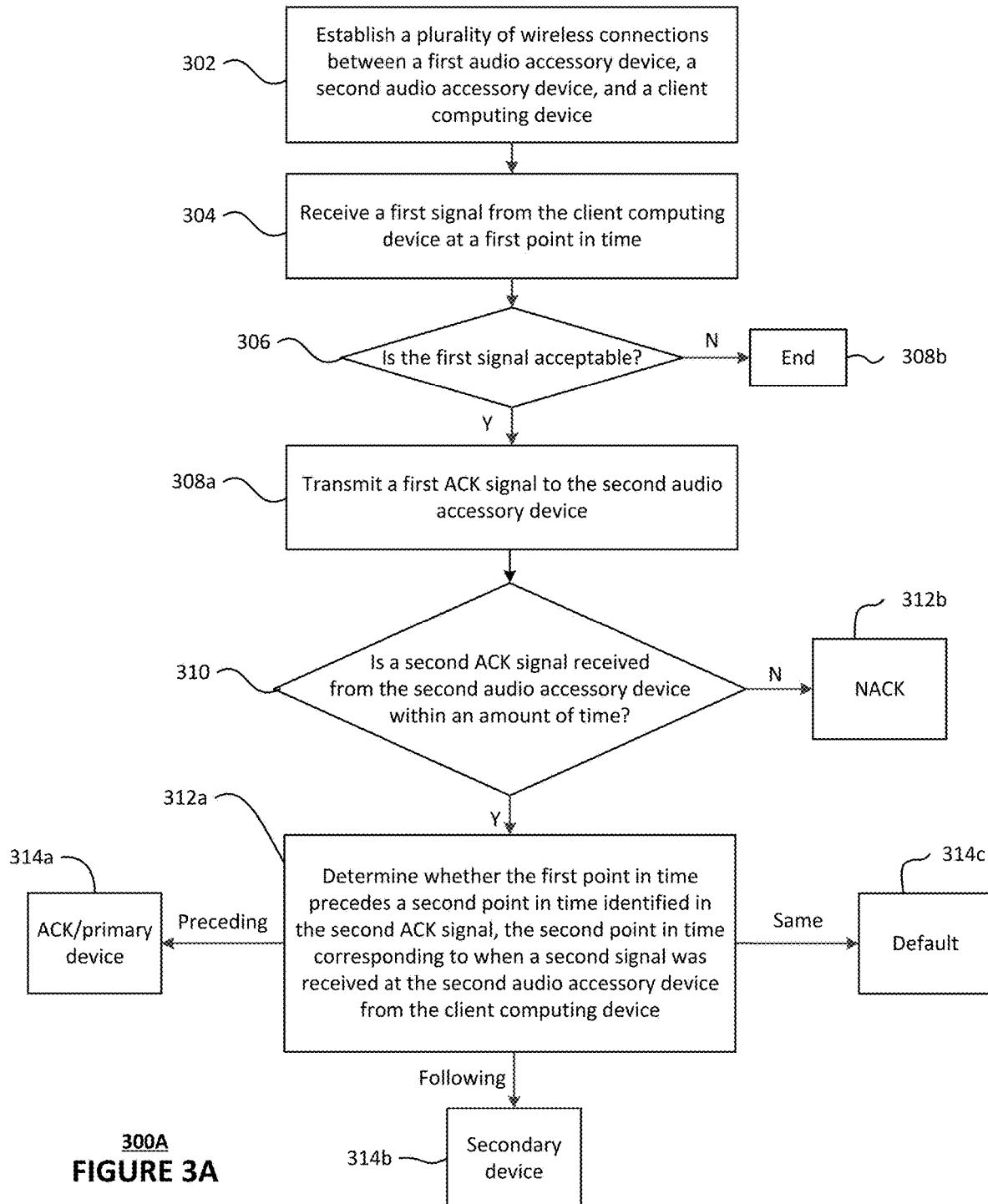
FIG. 3A is a flow diagram 300A of an example method in accordance with aspects of the disclosure.

The one or more computing devices of the audio accessory devices 130 and 140 may be configured to properly connect with client computing device 110 using a series of acknowledgement packets. In FIG. 3A, flow diagram 300A depicts a method of connecting the audio accessory devices with the client computing device 110 according to some of the aspects described above, and therefore is described in relation to the example computing device 110 and audio accessories 130, 140 of FIG. 1, though it should be understood that the method may be applied to any of a variety of systems. FIG. 3A is further described below in connection with FIGS. 3B-3C, which illustrate the timing of signals transmitted between the first audio accessory device 130 and the second audio accessory device 140. For clarity, the timeline of operations for the first audio accessory device 130 is shown in FIGS. 3B and 3C above a dotted line, while the timeline of operations for the second audio accessory device 140 is shown below the dotted line. While FIG. 3A shows blocks in a particular order, the order may be varied and that multiple operations may be performed simultaneously. Also, operations may be added or omitted.

At block 302, a plurality of wireless connections are established among one or more first processors 131 of a first audio accessory device 130, one or more second processors 141 of a second audio accessory device 140, and a client computing device 110. For example, the one or more first processors 131 of the first audio accessory device 130 may establish a first connection 127a with the client computing device 110, and one or more second processors 141 of the second audio accessory device 140 may establish a second connection 127b with the one or more processors 112 of the client computing device 110. The first connection 127a may be a wireless connection, such as a Bluetooth connection, between connection component 126 of the client computing device 110 and the connection component 137 of the audio accessory device 130. The second connection 127b may be a wireless connection, such as a Bluetooth connection, between connection component 126 of the client computing device 110 and the connection component 147 of the client computing device 110. Both the first connection 127a and the second connection 127b may be configured to support a channel for streaming media from the client computing device 110 to the audio accessory devices 130, 140, such as an Advanced Audio Distribution Profile (A2DP) channel.

A third connection 157 may be established between the one or more first processors 131 and the one or more second processors 141. The third connection may be a wireless connection, such as a Bluetooth connection, between connection component 137 of the audio accessory device 130 and connection component 147 of the audio accessory device 140. Other types of wireless connection may be utilized for the first, second, and third connections.

At block 304, the one or more first processors 131 of the first audio accessory device 130 receive a first signal from the client computing device 110 at a first point in time. As shown in FIGS. 3B and 3C, the first signal 320 is received at the first audio accessory device 130 at first point in time 322. The first signal may be transmitted from the connection component 126 of the client computing device 110 and may be received at the connection component 137 of the audio accessory device 130 via the wireless connection 127a. The first signal may carry a first preamble and a first frame of audio information. The first frame of audio information may be used by the one or more processors 131 to provide first audio output from the speaker 135. The first preamble may indicate a size of the first frame of audio information. The one or more first processors 131 may set up a media streaming channel on wireless connection 127a based on the received first signal.

After receipt of the first signal, the one or more first processors 131 may in some instances decode the preamble and determine that the size of the first frame of audio information requires an uplink of at least a set amount of time. The set amount of time may be determined to be longer than a threshold amount of time for relaying acknowledgement (ACK) signals between the first audio accessory device 130 and the second audio accessory device 140. For instance, referring to the examples in FIGS. 3B and 3C, set amount of time 324 may be 1.25 milliseconds, or more or less, and threshold amount of time 326 may be 600 microseconds, or more or less. The one or more first processors 131 may then set up a media streaming channel on wireless connection 127a that includes selecting a packet size based on the set amount of time. The packet size may divide the first frame of audio information to be uploaded over the set amount of time.

The first signal may be related to a second signal, such as second signal 340 shown in FIGS. 3B and 3C, that may also be transmitted from the connection component 126 of the client computing device 110. The second signal may carry a second preamble and a second frame of audio information. The second frame may be related to the first frame, such that the second frame of audio information may be used to provide second audio output from a speaker, such as speaker 145 of the second audio accessory device 140, that corresponds with the audio output from the speaker 135 based on the first frame of audio information. For example, the second audio output may be the same as the first audio output, such as for providing mono audio, or the second audio output may complement the first audio output, such as for providing stereo audio.

At block 306, the one or more first processors 131 verify whether the first signal is acceptable. For example, the first signal may be verified as acceptable when it satisfies the error-detecting code either before or after error correction of the first signal. For example, the one or more first processors 131 may process the first signal using an error-detecting code, such as a cyclic redundancy check. The first signal may also be processed using an error-correcting code. When verified, the process may continue to block 308a. When the first signal is not verified, such as when it does not satisfy the error-detecting code, the process ends at block 308b. Alternatively, at block 308b, the one or more first processors 131 may transmit negative-acknowledgement (NACK) signal to the client computing device 110.

At block 308a, the one or more first processors 131 transmit a first ACK signal to the one or more second processors 141 after the first signal is verified as acceptable. For example, first ACK signal 328 is transmitted from the first audio accessory device 130 to the second audio accessory device 140 as shown in FIGS. 3B and 3C. The first ACK signal may be transmitted via the wireless connection 157 at a second point in time. The second point in time may be within the threshold amount of time after the first point in time. The first ACK signal may include a first timestamp regarding when the first signal was received by the one or more first processors 131, or the first point in time. For example, the first ACK signal 328 may include a first timestamp for the first point in time 322, when the first signal 320 was received.

At block 310, the one or more first processors 131 determine whether a second ACK signal has been received from the one or more second processors 141 via the wireless connection 157 within the threshold amount of time after the first point in time. The second ACK signal may be transmitted by the one or more second processors 141 after the second signal is received by the one or more second processors 141 at a second point in time. The second point in time may be before, simultaneous with, or after the first point in time. In addition, the second ACK signal may include a second timestamp regarding when the second signal was received by the one or more second processors 141, or the second point in time. The process may then proceed to block 312a or 312b depending on the result of the determination.

When the one or more first processors 131 determine that the second ACK signal has been received within the threshold amount of time, the one or more first processors 131 may proceed to block 312a. For example, the second ACK signal may be received by the one or more first processors 131 at a third point in time. The one or more first processors 131 may then determine that the third point in time is within the threshold amount of time after the first point in time. As shown in FIG. 3B, second ACK signal 348 is transmitted from the second audio accessory device 140 and carries a second timestamp for the second point in time 342, when the second signal 340 was received. The second ACK signal 348 is then received at the first audio accessory device 130 at the third point in time 330, which is within the threshold amount of time 326.

At block 312a, the one or more first processors 131 determine whether the first point in time precedes the second point in time. The second point in time may be derived from the second ACK signal received by the one or more first processors 131, and may be compared with the first point in time. In the example illustrated in FIG. 3B, the one or more first processors 131 compares the first point in time 322 and the second point in time 342. This may include determining whether the first point in time is earlier or later in time than the second point in time.

When the first point in time is determined to precede or be earlier in time than the second point in time, the one or more first processors 131 may transmit a third ACK signal to the one or more processors 112 of the client computing device 110 via wireless connection 127a at block 314a. In addition, the one or more first processors 131 may also identify the audio accessory device 130 as a primary device that transmits and receives communications that need only utilize one of the audio accessory devices 130, 140.

When the first point in time is determined to follow or be later in time than the second point in time, the one or more first processors 131 may identify the first audio accessory device 130 as a secondary device at block 314b. As a result, the one or more first processors 131 may not transmit the third ACK signal to the one or more processors 112 of the client computing device 110.

In the case when the first point in time is determined to be simultaneous with the second point in time, the one or more first processors 131 may identify the first audio accessory device 130 based on a default setting. The default setting may indicate that a given audio accessory device is either the default primary device or the default secondary device. In the example shown in FIG. 3B, the first point in time 322 and the second point in time 342 is determined to be simultaneous. In this example, the default setting for the first audio accessory device 130 may identify the first audio accessory device as the default primary device, and the default setting for the second audio accessory device 140 may identify the second audio accessory device 140 as the default secondary device. Third ACK signal 332 is therefore transmitted from the first audio accessory device 130 to the client computing device 110.

Returning to block 310, when the one or more first processors 131 determine that the second ACK signal has not been received within the threshold amount of time after the first point in time, the one or more first processors 131 may proceed to block 312b. For example, the one or more first processors 131 may determine that the threshold amount of time after the first point in time has elapsed and that the second ACK signal has not been received by the end of the threshold amount of time.

Then at block 312b, the one or more first processors 131 transmit a NACK signal to the one or more processors 112 of the client computing device 110 via the wireless connection 127a. In the example of FIG. 3C, the threshold amount of time 326 elapses at the first audio accessory device 130 without receipt of a second ACK signal from the second audio accessory device 140. The first audio accessory device 130 therefore transmits NACK signal 334 to the client computing device 110.

The one or more second processors 141 of the second audio accessory device 140 may perform the steps depicted in flow diagram 300A in parallel to the one or more first processors 131 of the first audio accessory device 130. Namely, the one or more second processors 141 may receive the second signal from the client computing device 110 at the second point in time (see block 304), verify that the second signal is acceptable (see block 306), and transmit the second ACK signal to the one or more first processors 131 if the second signal is verified as acceptable (see block 308a). If the second ACK signal is transmitted, the one or more second processors 141 may then determine whether the first ACK signal has been received from the one or more first processors 131 via the wireless connection 157 within the threshold amount of time after the second point in time (see block 310). If the first ACK signal is not received within the threshold amount of time after the second point in time, the one or more second processors 141 may send the NACK signal (see block 310b), but if it is received, the one or more second processors 141 may determine whether the second point in time precedes the first point in time (see block 312a). When the second point in time precedes the first point in time, the one or more second processors 141 may send the third ACK signal to the client computing device 110, identifying the second audio accessory device 140 as a primary device (see block 314a). When the second point in time follows the first point in time, the one or more second processors 141 may identify the second audio accessory device 140 as a secondary device and not send the third ACK signal (see block 314b). Or when the second point in time is simultaneous with the first point in time, the one or more second processors 141 may identify as a default setting, which in this case may be the secondary device (see block 314c).

After the one or more processors 131 and 141 perform the steps of flow diagram 300A, one of the first audio accessory device 130 and the second audio accessory device 140 may be identified as the primary device and the other may be identified as the secondary device. In addition, as the one or more processors of the audio accessory devices 130, 140 verifies the respective signals received from the client computing device 110, the audio accessory devices 130 and 140 may be properly synced with one another and may both be prepared to continue streaming media transmitted from the client computing device 110. Additionally or alternatively, the one or more computing devices of the audio accessory devices 130 and 140 may be configured to prevent improper audio playback from client computing device 110 using a jamming signal.

Figure 4A:
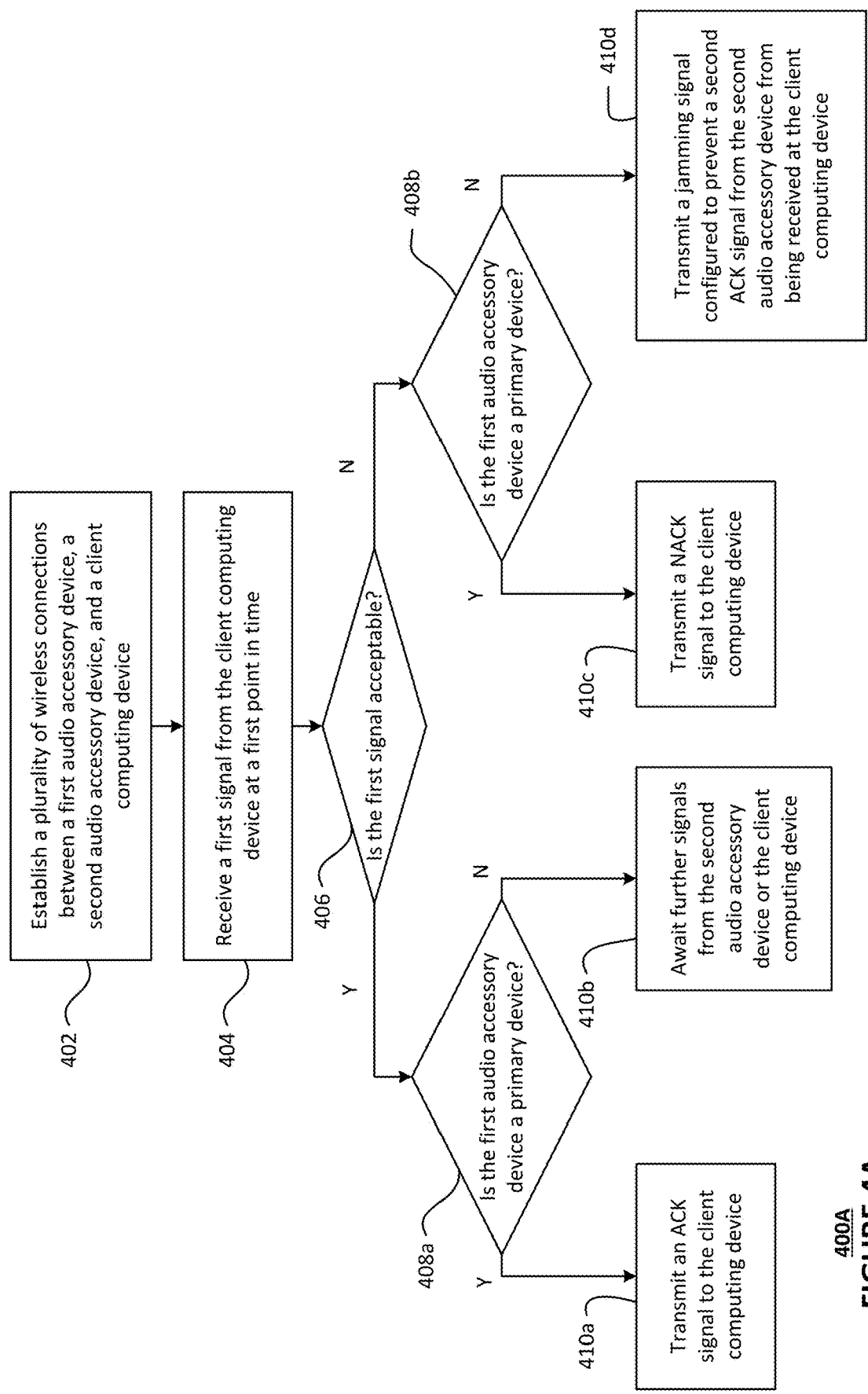
FIG. 4A is a flow diagram 400A of an example method in accordance with aspects of the disclosure.

In FIG. 4A, flow diagram 400A depicts a method of connecting the audio accessory devices with the client computing device 110 according to some of the aspects described above, and therefore is described in relation to the example computing device 110 and audio accessories 130, 140 of FIG. 1, though it should be understood that the method may be applied to any of a variety of systems. FIG. 4A is further described below in connection with FIGS. 4B-4C, which illustrate the timing of signals transmitted between the first audio accessory device 130 and the second audio accessory device 140. For clarity, the timeline of operations for the first audio accessory device 130 is shown in FIGS. 4B and 4C above a dotted line, while the timeline of operations for the second audio accessory device 140 is shown below the dotted line. While FIG. 4A shows blocks in a particular order, the order may be varied and that multiple operations may be performed simultaneously. Also, operations may be added or omitted.

At block 402, a plurality of wireless connections are established between one or more first processors 131 of a first audio accessory device 130, one or more second processors 141 of a second audio accessory device 140, and a client computing device 110 in a same or similar manner as described in block 302.

At block 404, the one or more first processors 131 of the first audio accessory device 130 receive a first signal from the client computing device 110 at a first point in time. In the example shown in FIGS. 4B and 4C, first signal 420 is received at the first audio accessory device 130 at first point in time 422.

The first signal may be transmitted from the connection component 126 of the client computing device 110 and may be received at the connection component 137 of the audio accessory device 130 via the wireless connection 127a. The first signal may carry a first preamble and a first frame of audio information. The first preamble may indicate a size of the first packet of audio information, the first frame of audio information may be used by the one or more processors 131 to provide first audio output from the speaker 135. The one or more first processors 131 may set up a media streaming channel on wireless connection 127a based on the received first signal.

After receipt of the first signal, the one or more first processors 131 may, in some instances, decode the preamble and determine that the size of the first frame of audio information requires an uplink of at least a set amount of time. The set amount of time may be determined to be shorter than a threshold amount of time for relaying acknowledgement (ACK) signals between the first audio accessory device 130 and the second audio accessory device 140. For example, in FIGS. 4B and 4C, set amount of time 424 is 500 microseconds, or more or less, and the threshold amount of time 426 is 600 microseconds, or more or less.

The one or more first processors 131 may then implement a jamming signal process, such as the process described with respect to FIG. 4A, because the set amount of time is less than the threshold amount of time. The jamming signal process may allow the one or more first processors 131 to respond to the first signal in a smaller amount of time than the set amount of time. For example, the one or more first processors 131 in FIGS. 4B and 4C may be configured to respond to the first signal with an ACK, NACK, or jamming signal within 260 microseconds, which is less than the set amount of time of 500 microseconds, when using the jamming signal process described herein. In some embodiments, implementing the jamming single processes may include selecting the jamming signal process from a plurality of possible processes based on the set amount of time, where the plurality of possible processes also includes a ACK relaying process, such as the process described with respect to FIG. 3A.

At block 406, the one or more first processors 131 verify that the first signal is acceptable, for instance, in a same or similar manner as described above with respect to block 306. When the first signal is verified as acceptable, at block 408a, the one or more first processors 131 determine how to respond based on whether the first audio accessory device 130 is a primary device or a secondary device in relation to the second audio accessory device 140. In the case where ACK signals are not being relayed between the first and second audio accessory devices, the designations for primary and secondary devices may be preset to the default settings. When the first audio accessory device 130 is identified as a primary device, the one or more first processors 131 transmit an ACK signal to the client computing device 110 at block 410a. When the first audio accessory device 130 is identified as a secondary device, the one or more first processors 131 may await further instruction from the second audio accessory device 140 or the client computing device 110 at block 410b. In either case, the one or more first processors 131 may then be ready to initiate audio output from speaker 135. In the example of FIG. 4B, the first signal 420 is verified as acceptable at the first audio accessory device 130, and second signal 440 is verified as acceptable at the second audio accessory device 140. In addition, the first audio accessory device 130 in FIG. 4B is identified as the primary device as a default setting and transmits ACK signal 428. The second audio accessory device 140, on the other hand, is identified as the secondary device and does not transmit an ACK signal, and awaits further instruction.

Returning to block 406, when the first signal is not verified as acceptable, the one or more first processors 131 determine how to respond at block 408b based on whether the first audio accessory device 130 is a primary device or a secondary device in relation to the second audio accessory device 140. The primary or secondary device identification may be determined in a same or similar way as described with respect to block 408a. When the first audio accessory device is identified as a primary device, the one or more first processors 131 transmit a NACK signal to the client computing device 110 at block 410c. When the first audio accessory device 130 is identified as a secondary device, the one or more first processors 131 transmit a jamming signal at block 410d. The jamming signal may be configured to prevent any ACK signal potentially transmitted by the one or more second processors from being received by the client computing device 110. For example, the jamming signal may mostly correlate with the length and/or other signal characteristics of at least the preamble of the ACK signal transmitted by the one or more second processors.

In the example of FIG. 4C, the first signal 420 is not verified as acceptable at the first audio accessory device 130, and the second signal 440 is verified as acceptable at the secondary audio accessory device 140. In addition, the first audio accessory device in FIG. 4C is identified as the secondary device and transmits a jamming signal 430. The jamming signal 430 is configured to prevent the client computing device 110 from receiving the ACK signal 442 transmitted from the second audio accessory device 140, which is the primary device.

In instances where the set amount of time is longer than the threshold amount of time, rather than transmitting an ACK signal to the client computing device 110 at block 408a, the one or more first processors 131 may transmit a first ACK signal to the one or more second processors 141 after the first signal is verified as acceptable in a same or similar manner as described above with respect to block 308a. The one or more first processors 131 may then determine whether a second ACK signal has been received from the one or more second processors 141 via the wireless connection 157 within the threshold amount of time after the first point in time as described in block 310. If determined affirmatively, the one or more first processors 131 may proceed to identify whether the first audio accessory device 130 is a primary or secondary device and proceed to operate as such in a same or similar manner as described in blocks 312a, 314a, 314b, and/or 314c. On the other hand, if determined negatively, the one or more first processors 131 may transmit the jamming signal in a same or similar manner as described in block 408b.

The one or more second processors 141 of the second audio accessory device 140 may perform the steps described in flow diagram 400 in parallel to the one or more first processors 131 of the first audio accessory device 130. Namely, the one or more second processors 141 may receive the second signal from the client computing device 110 at the second point in time (see block 404), verify whether the second signal is acceptable (see block 406), and transmit an ACK signal to the client computing device 110 if the second signal is verified as acceptable (see block 408a) or transmit a jamming signal if the second signal is not verified (see block 408b).

The foregoing systems and methods are beneficial in that they mitigate packet loss, thereby reducing audio glitching during audio playback through wireless accessories, such as earbuds. A miss rate of data may correspond to a miss rate of a header of the A2DP packet for the jamming signal, which is low. The miss rate may be further reduced by setting an accessory with a weaker RF signal to serve as the primary device, such that the jamming signal is stronger and can effectively block the ACK signal.

While the foregoing methods and systems were primarily described with respect to the example of a pair of earbuds, it should be understood that the first and second audio devices may be any of a variety of audio accessories, such as an augmented reality or virtual reality headset, smart glasses, speakers, video displays, etc.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
   establishing, by one or more processors at a first audio accessory device, a first wireless connection with a second audio accessory device and a second wireless connection with a client computing device;
   receiving, by the one or more processors, a first signal from the client computing device at a first point in time via the second wireless connection;
   determining, by the one or more processors, whether the first signal is acceptable;
   when the first signal is acceptable, transmitting, by the one or more processors, a first acknowledgement (ACK) signal to the second audio accessory device via the first wireless connection;
   determining, by the one or more processors, whether a second ACK signal from the second audio accessory device is received by the one or more processors within an amount of time;
   when the second ACK signal is received within the amount of time, determining, by the one or more processors, a status identification for the first audio accessory device, wherein the status identification identifies the first audio accessory device as a primary device or secondary device; and
   operating, by the one or more processors, the first audio accessory device based on the determined status identification.

2. The method of claim 1, further comprising determining, by the one or more processors, whether the first signal satisfies an error-detecting code, wherein the first signal is acceptable when it satisfies the error-detecting code.

3. The method of claim 2, further comprising performing, by the one or more processors, error correction of the first signal, wherein determining whether the first signal satisfies the error-detecting code is performed before the error correction of the first signal.

4. The method of claim 2, further comprising performing, by the one or more processors, error correction of the first signal, wherein determining whether the first signal satisfies the error-detecting code is performed after the error correction of the first signal.

5. The method of claim 1, wherein the second ACK signal includes a timestamp for a second point in time when a second signal from the client computing device is received at the second audio accessory device.

6. The method of claim 1, further comprising, when status identification identifies the first audio accessory device as the secondary device, transmitting, by the one or more processors, a jamming signal configured to prevent the client computing device from receiving an acknowledgement (ACK) signal from the second audio accessory device.

7. The method of claim 1, further comprising, when the first signal is not acceptable, determining, by the one or more processors, whether the first audio accessory device is a secondary device in relation to the second audio accessory device.

8. A first audio accessory device, comprising:
   a memory;
   one or more processors in communication with the memory, the one or more processors configured to:
      establish a first wireless connection with a second audio accessory device;
      establish a second wireless connection with a client computing device;
      receive a first signal from the client computing device at a first point in time via the second wireless connection;
      determine whether the first signal is acceptable;
      when the first signal is acceptable, transmit a first acknowledgement (ACK) signal to the second audio accessory device via the first wireless connection;

determine whether a second ACK signal from the second audio accessory device is received by the one or more processors within an amount of time;

when the second ACK signal is received within the amount of time, determine a status identification for the first audio accessory device, wherein the status identification identifies the first audio accessory device as a primary device or secondary device; and operate the first audio accessory device based on the determined status identification.

9. The first audio accessory device of claim 8, wherein the one or more processors are further configured to determine whether the first signal satisfies an error-detecting code, wherein the first signal is acceptable when it satisfies the error-detecting code.

10. The first audio accessory device of claim 9, wherein the one or more processors are further configured to perform error correction of the first signal, wherein determining whether the first signal satisfies the error-detecting code is performed after the error correction of the first signal.

11. The first audio accessory device of claim 9, wherein the one or more processors are further configured to perform error correction of the first signal, wherein determining whether the first signal satisfies the error-detecting code is performed before the error correction of the first signal.

12. The first audio accessory device of claim 8, wherein the second ACK signal includes a timestamp for a second point in time when a second signal from the client computing device is received at the second audio accessory device.

13. The first audio accessory device of claim 8, wherein the one or more processors are further configured to transmit, when status identification identifies the first audio accessory device as the secondary device, a jamming signal configured to prevent the client computing device from receiving an acknowledgement (ACK) signal from the second audio accessory device.

14. The first audio accessory device of claim 8, wherein the one or more processors are further configured to determine, when the first signal is not acceptable, whether the first audio accessory device is a secondary device in relation to the second audio accessory device.

15. A system, comprising:
a first audio accessory device;
a second audio accessory device;
wherein the first audio accessory device is configured to:
establish a first wireless connection with the second audio accessory device;
establish a second wireless connection with a client computing device;
receive a first signal from the client computing device at a first point in time via the second wireless connection;
determine whether the first signal is acceptable;
when the first signal is acceptable, transmit a first acknowledgement (ACK) signal to the second audio accessory device via the first wireless connection;
determine whether a second ACK signal from the second audio accessory device is received by the one or more processors within an amount of time;
when the second ACK signal is received within the amount of time, determine a status identification for the first audio accessory device, wherein the status identification identifies the first audio accessory device as a primary device or secondary device; and
operate the first audio accessory device based on the determined status identification.

16. The system of claim 15, wherein the first audio accessory device is further configured to transmit, when status identification identifies the first audio accessory device as the secondary device, a jamming signal configured to prevent the client computing device from receiving an acknowledgement (ACK) signal from the second audio accessory device.

17. The system of claim 15, wherein the first audio accessory device is further configured to determine, when the first signal is not acceptable, whether the first audio accessory device is a secondary device in relation to the second audio accessory device.

* * * * *